US006791828B2

(12) United States Patent
Gough et al.

(10) Patent No.: US 6,791,828 B2
(45) Date of Patent: Sep. 14, 2004

(54) REMOVABLE MEDIA DRIVES

(75) Inventors: Gerald Ronald Gough, Houghton Regis (GB); Sean Conor Wrycraft, Harrow (GB)

(73) Assignee: Sun Microsystems, Inc., Santa Clara, CA (US)

( * ) Notice: Subject to any disclaimer, the term of this patent is extended or adjusted under 35 U.S.C. 154(b) by 35 days.

(21) Appl. No.: 10/050,360

(22) Filed: Jan. 16, 2002

(65) Prior Publication Data

US 2002/0094713 A1 Jul. 18, 2002

(30) Foreign Application Priority Data

Jan. 17, 2001 (GB) ............................................ 0101213

(51) Int. Cl.[7] ................................................ G06F 1/16
(52) U.S. Cl. .................... 361/685; 361/801; 312/223.2
(58) Field of Search ................................ 361/685–687, 361/724–727, 753, 759, 788, 801; 312/223.1–223.2

(56) References Cited

U.S. PATENT DOCUMENTS

| | | | | |
|---|---|---|---|---|
| 5,226,828 A | | 7/1993 | Fietz | 439/160 |
| 5,510,955 A | | 4/1996 | Taesang | 361/685 |
| 5,564,804 A | | 10/1996 | Gonzalez et al. | 312/223.2 |
| 5,572,402 A | | 11/1996 | Jeong | 361/685 |
| 5,588,728 A | | 12/1996 | Eldridge et al. | 312/332.1 |
| 5,652,695 A | | 7/1997 | Schmitt | 361/685 |
| 5,673,171 A | | 9/1997 | Varghese et al. | 361/685 |
| 5,673,172 A | | 9/1997 | Hastings et al. | 361/685 |
| 5,726,864 A | | 3/1998 | Copeland et al. | 361/800 |
| 5,751,551 A | * | 5/1998 | Hileman et al. | 361/753 |
| 5,868,261 A | * | 2/1999 | Collins et al. | 211/26 |
| 5,926,366 A | * | 7/1999 | Collins et al. | 361/685 |
| 5,940,265 A | | 8/1999 | Ho | 361/685 |
| 6,061,232 A | | 5/2000 | Ho | 361/685 |
| 6,067,225 A | | 5/2000 | Reznikov et al. | 361/685 |
| 6,088,222 A | | 7/2000 | Schmitt et al. | 361/686 |
| 6,185,097 B1 | | 2/2001 | Behl | 361/695 |
| 6,373,707 B1 | * | 4/2002 | Hutchins | 361/725 |
| 6,421,236 B1 | * | 7/2002 | Montoya et al. | 361/685 |

FOREIGN PATENT DOCUMENTS

| | | |
|---|---|---|
| EP | 0 713 219 | 11/1995 |
| JP | 07220464 | 8/1995 |
| JP | 11348675 | 12/1999 |

OTHER PUBLICATIONS

International Search Report application No. GB0101213.7, mailed May 7, 2002.
International Search Report, application No. PCT/GB02/0056, international filing date Aug. 1, 2002.

* cited by examiner

*Primary Examiner*—Hung Van Duong
(74) *Attorney, Agent, or Firm*—Meyertons Hood Kivlin Kowert & Goetzel, P.C.; B. Noël Kivlin

(57) ABSTRACT

A system unit includes a media drive bay. The media drive bay includes a metal drive bay housing configured to receive a media drive. A connector is provided to interface with a connector on a received media drive. A resilient tongue integral with the media drive bay housing is operable to urge onto a received media drive to hold the media drive in place and to ground a casing of the media drive. A detent is provided for latching a latching member attached to the media drive casing. The media drive can be a commercially available media drive for non-removable use, the media drive being modified by the provision of the latching member to provide for removability.

26 Claims, 6 Drawing Sheets

REMOVABLE MEDIA DRIVES

BACKGROUND OF THE INVENTION

This invention relates to removable media drives for computer systems and the like.

Computer systems typically contain different types of media drives that are located within the system housing. For most desk-based and rack-mounted systems the media drives are not intended to be removed, and are therefore screwed in place within the system housing. As such components are not "user-replaceable" parts, the packaging of such drives is typically kept to a minimum to minimize costs.

It is known to provide portable computer systems with removable media drives. This is typically done to enable different types of media drives to be installed within a compact system housing. This means that the possibility of using different media drives can be provided without needing to house all of the media drives in the housing at one time. Such media drives are normally housed in a carrier housing, which can be used to protect the media drive and/or for aesthetic reasons. However this adds to the cost of the removable media systems.

In computer systems designed to have high reliability, for example server computer systems, it is desirable to be able readily to change media drives in the event that they develop a fault. It would be desirable to use commercially available removable media drives. However, as described above, these tend to be expensive.

Accordingly, the present invention seeks to provide media drives for such applications that can readily be removed, without the expense of the conventional removable media drives.

SUMMARY OF THE INVENTION

A first aspect of the invention provides a system unit comprising a media drive bay, the media drive bay comprising a drive bay housing configured to receive a media drive, a connector to interface with a connector on a received media drive, a resilient tongue integral with the media drive bay housing, which resilient tongue is operable to urge onto a received media drive, and a detent for latching a latching member attached to the media drive.

The provision of the resilient tongue in combination with the detent for latching an inserted media drive means that a media drive intended for permanent installation can be securely held in a removable manner without the use of fasteners and tools. Because a standard media drive not originally designed for a removable application can be used, with the addition of the latching member, the cost of providing removability is kept low. Where the drive bay housing is made of metal, the provision of the tongue also serves to ground the media drive casing, reducing electromagnetic interfence.

In an embodiment of the invention the resilient tongue is located on a first side of the drive bay housing. Support surfaces are defined on a second side of the drive bay housing opposite to the first side. In this manner, the resilient tongue applies pressure on an inserted media drive to press the media drive against the support surfaces. This provides secure mounting of the media drive within the housing, while allowing for reasonable tolerance during manufacture of the drive bay housing. The support surfaces can be configured to form slides to facilitate sliding of the media drive into the media drive housing.

Another aspect of the invention provides the system unit in combination with the media drive.

A further aspect of the invention provides a latching member to be secured to a rear surface of a media drive, the latching member comprising a plate including formations to enable securing of the latching member to the rear surface of the media drive and an integral resilient latching projection.

The resilient latching projection has an elongate portion that extends substantially perpendicularly in the plane of the plate and a latch at the end of the elongate portion remote from the plate.

The latching member can be secured to the rear surface of the media drive by screws that engage with pre-existing holes on the media drive casing.

The latch at then end of the resilient latching projection is configured to latch behind the detent of the media drive bay housing when the media drive is received by the media drive.

The media drive can be a commercially available media drive for non-removable use, the media drive being modified by the provision of the latching member to provide for removability.

Another aspect of the invention comprises such a commercially available media drive for non-removable use, the media drive being modified by the provision of a latching member as described above to provide for removability.

Further aspects and advantages of the invention will become apparent from the following description of a particular embodiment.

BRIEF DESCRIPTION OF THE DRAWINGS

Embodiments of the present invention will be described hereinafter, by way of example only, with reference to the accompanying drawings in which like reference signs relate to like elements and in which.

DESCRIPTION OF PARTICULAR EMBODIMENTS

An embodiment of the present invention will now be described, by way of example only.

Figure 1:
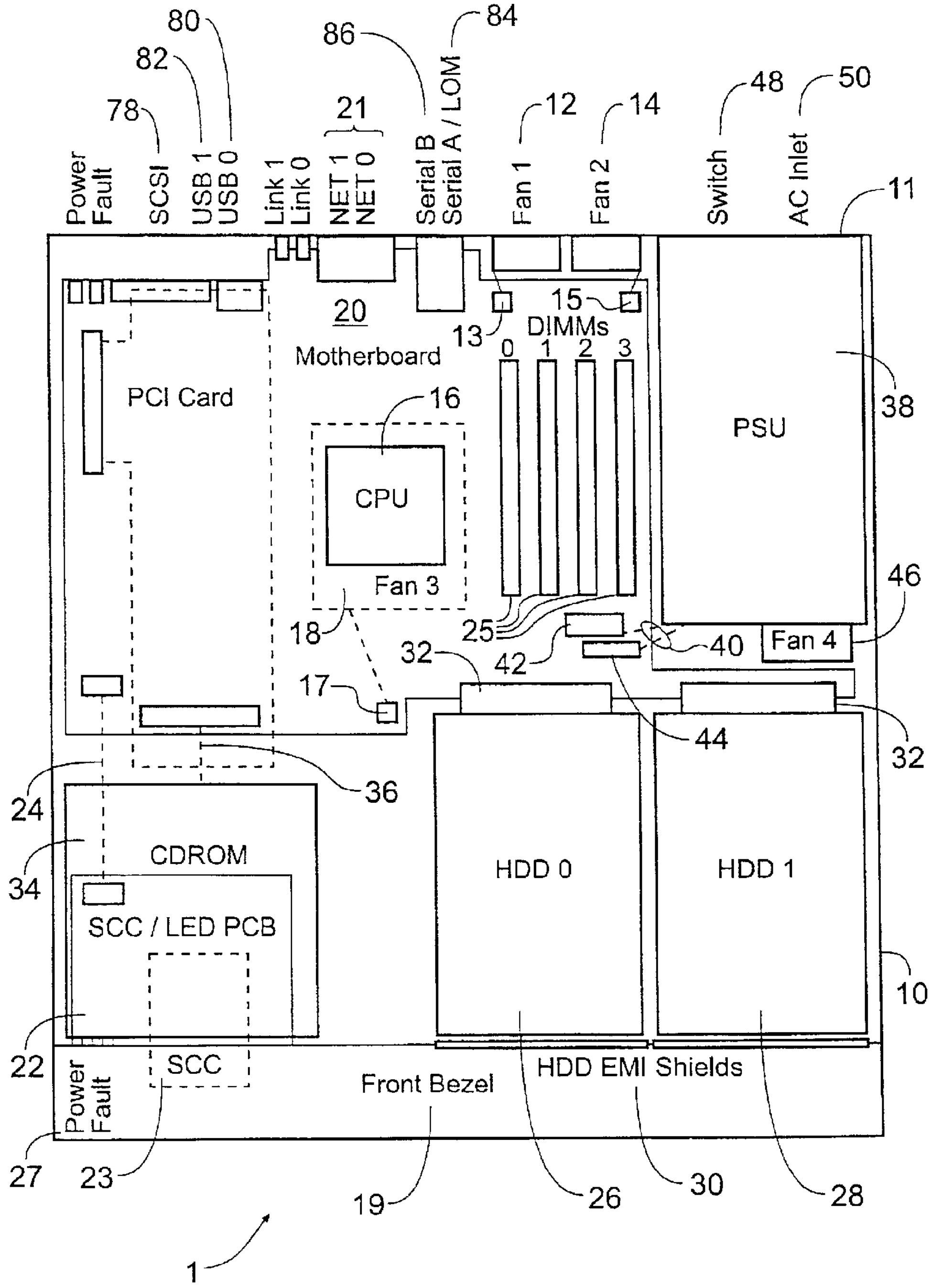
FIG. 1 is a physical plan view of a computer system that implements an embodiment of the invention.

FIG. 1 is a physical plan view of narrow form-factor computer system 1 designed for rack mounting. This computer system is compactly configured while offering high performance at reasonable cost.

The computer system 1 comprises an enclosure 10 with a front bezel 19 that is removable for front access to the disk drives and a System Configuration Card (SCC) 23 and reader 22. Rack mounting is supported for standard 19" racks via right-angled flanges (not shown). Slide-rail support is also provided.

The enclosure 10 is cooled, from front to rear, by two system fans 12, 14 mounted on a rear panel of the enclosure, with venting in the front and rear panels as required. The host processor (CPU) 16 also has its own dedicated local cooling comprising an impingement fan 18 that clips onto the CPU socket. These three fans plug directly into the motherboard 20 at 13, 15 and 17, respectively. The motherboard 20 is a PCB assembly, designed in a custom form-factor to fit the enclosure 10. The shape of the motherboard is chosen so as to minimize cabling within the enclosure. The motherboard 20 carries the majority of circuitry within the computer system 1.

All external interfaces are included directly on the rear edge of the motherboard, for access through the rear-panel 11 of the enclosure 10. The external interfaces comprise two network interfaces 21, two serial interfaces 84, 86 and a Small Computer System Interface (SCSI) interface 78. Indicators for Power, Fault and Network Link status are also positioned at the rear of the enclosure.

A system, or host, processor (CPU) 16 for the computer system 1 is mounted in a standard 370 pin zero insertion force (ZIF) socket on the motherboard 20. It has a passive heat sink. Dual in-line memory modules (DIMMS) are mounted in sockets 25 on the motherboard 20. A small printed circuit board (PCB) 22 is included at the front of the enclosure 10 to carry a System Configuration Card (SCC) 23 and LEDs 27 for Power and Fault status indication. A 10-way ribbon cable 24 connects this PCB to the motherboard 20. Two SCSI hard disk drives 26 and 28 are mountable in respective bays to the front of the motherboard 20. The drives are hot pluggable and are accessible by removal of the front bezel 19 and EMI shields 30. The two internal SCSI hard disk drives 26 and 28 plug directly into the motherboard via right-angled connectors 32 located on the front edge of the motherboard 20.

A slim CDROM drive bay is provided, mounted laterally in front of the motherboard for a CDROM drive 34. Compact disks may be inserted and removed via an access slot (not shown) located on the lower left side of the front bezel 19. A connector at the rear of the CDROM bay connects the CDROM drive 34 via a ribbon cable 36 to the motherboard 20.

A Power Supply Unit (PSU) 38 is connected to the motherboard via a short harness 40 with two mating connectors 42 and 44 for power and services. The PSU 38 has its own cooling fan 46 and additionally houses the system power switch 48 and power input connector(s) 50.

Figure 2:
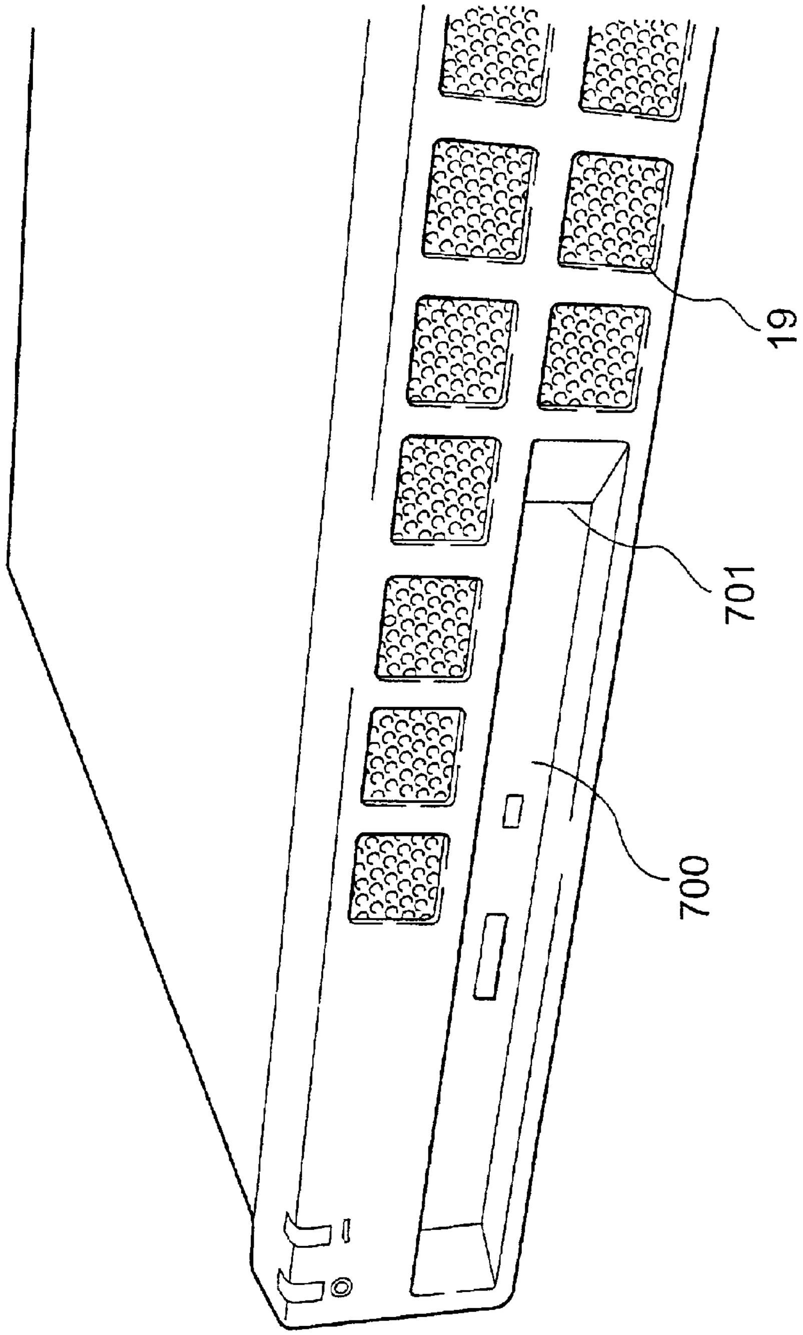
FIG. 2 illustrates part of the front of the computer system of FIG. 1.

FIG. 2 illustrates part of the front of the computer system of FIG. 1. This shows the front bezel 19 and the front 700 of a media drive, here the CD-ROM drive 34 that is accessible via the access slot 701 in the front bezel 19.

Figure 3:
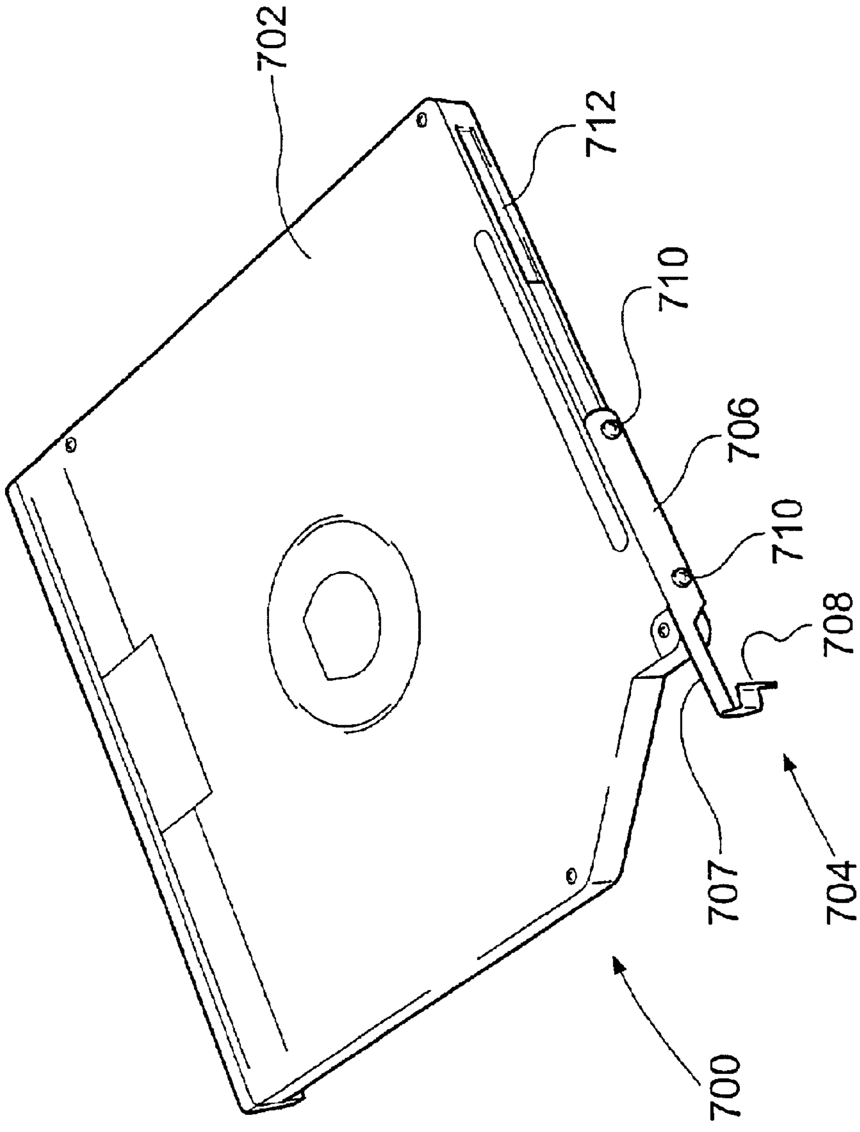
FIG. 3 illustrates a commercially available media drive that has been modified for an embodiment of the invention.

FIG. 3 illustrates a commercially available CD-ROM drive designed for non-removable use that has been modified for an embodiment of the invention. The CD-ROM drive 34 has a latching member 704 secured to the rear surface of the metal media drive casing 702 by means of fixings, for example screws, that use pre-existing threaded holes in the casing 702. A connector 712 can be seen at the rear of the media drive casing for the electrical connections to the CD-ROM drive 34.

Figure 4:
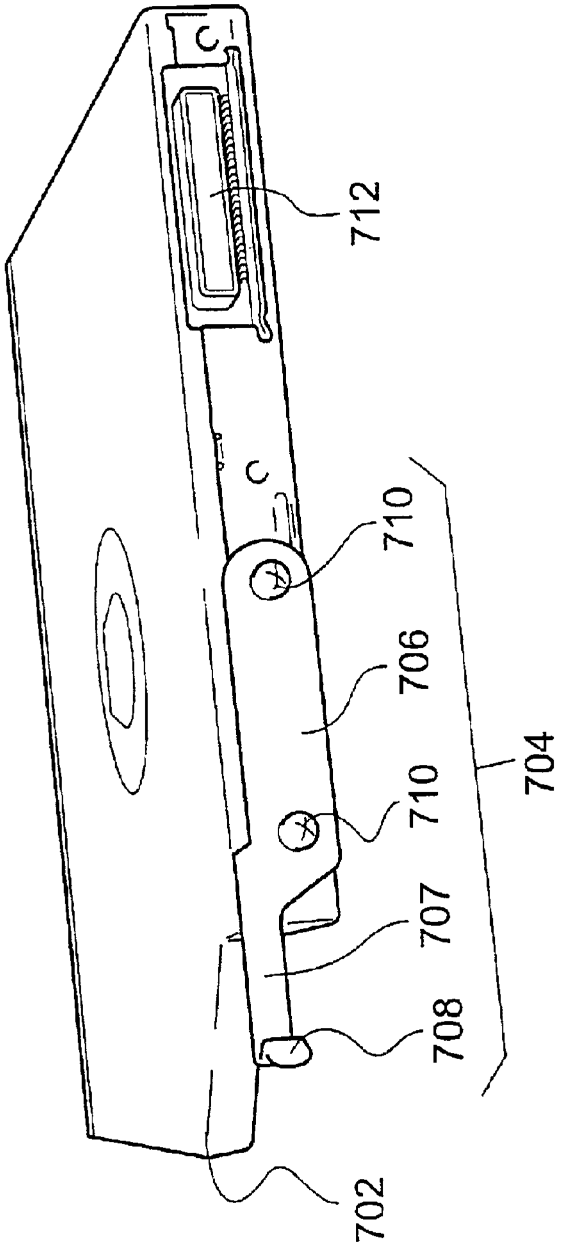
FIG. 4 is a further illustration of the modification to the media drive.

FIG. 4 is a further illustration of the modification to the media drive. This shows more clearly how the latching member 704 has a planar plate portion 706 that is screwed to the CD-ROM drive casing 702 by two screws 710. The latching member 704 also comprises a resilient latching projection that includes an elongate springy portion 707 with a latch 708 formed at the end thereof. The latching member 704 can be made of metal, for example of spring steel. FIG. 4 also shown the connector 712 in more detail.

Figure 5:
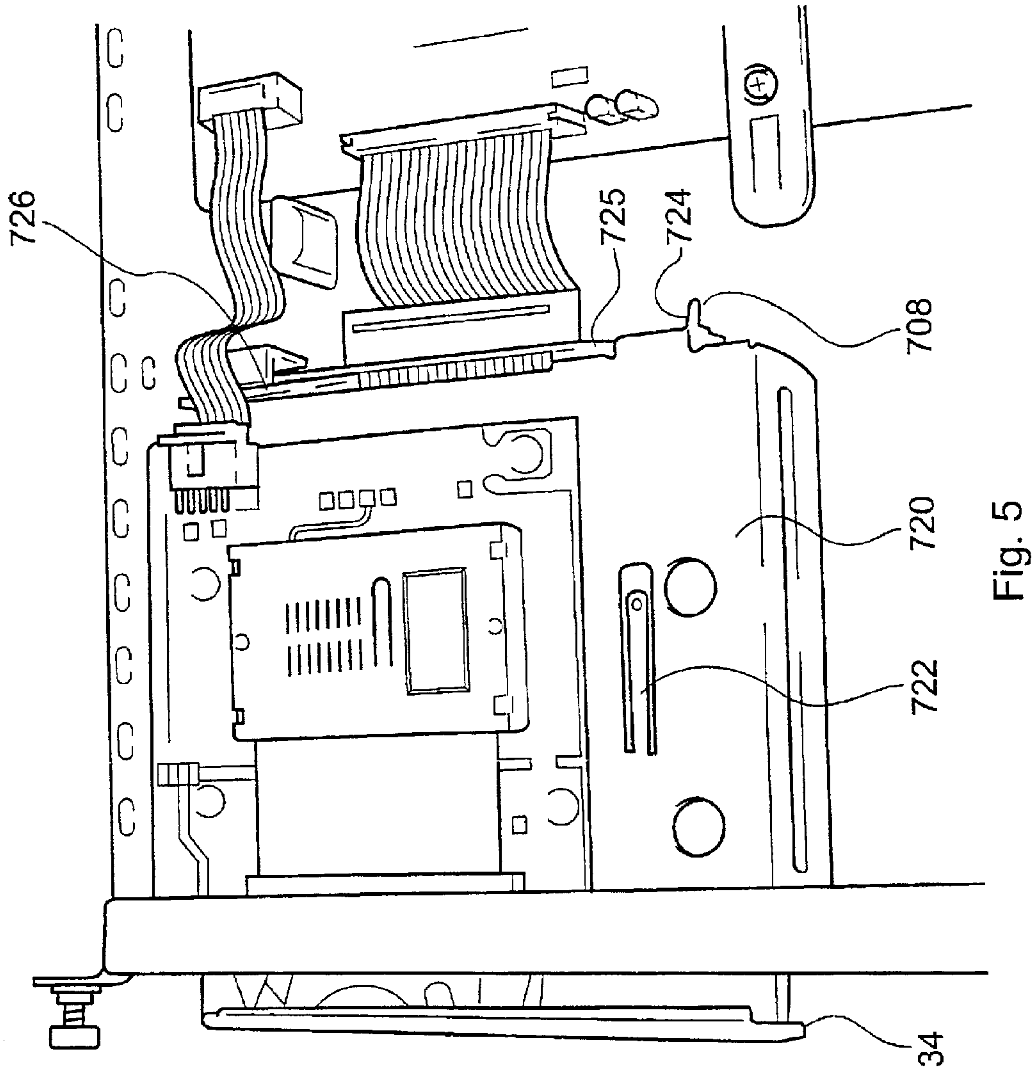
FIG. 5 illustrates a media drive housing of an embodiment of the invention.

FIG. 5 illustrates a media drive housing 720 of an embodiment of the invention. The media drive housing is an essentially box-shaped housing, preferably of metal, that is contained within and forms a part of the computer system housing 10.

A resilient tongue 722 is formed in the upper surface of the housing 720 and this bears down on the casing 702 of the CD-ROM drive when it is inserted in the housing 720.

A detent 724 is formed by a corner at the rear of the housing, and this is operable to engage with the latch 708 at the end of the elongate springy portion of the latching member 704 when the CD-ROM drive has been fully inserted within the media drive housing 720. The combination of the resilient tongue 722 and the detent 724 for latching with the latch 708 of the latch member 704 of the inserted media drive 34 means that the CD-ROM drive can be securely held in a removable manner without the use of fasteners and tools. The resilient metal tongue 722 integral with the metal media drive housing 720 also serves to ground the media drive casing.

A circuit board 725 with a connector 726 is provided at the rear of the media drive housing for effecting electrical connection to the connector 712 on the CD-ROM drive 34.

Figure 6:
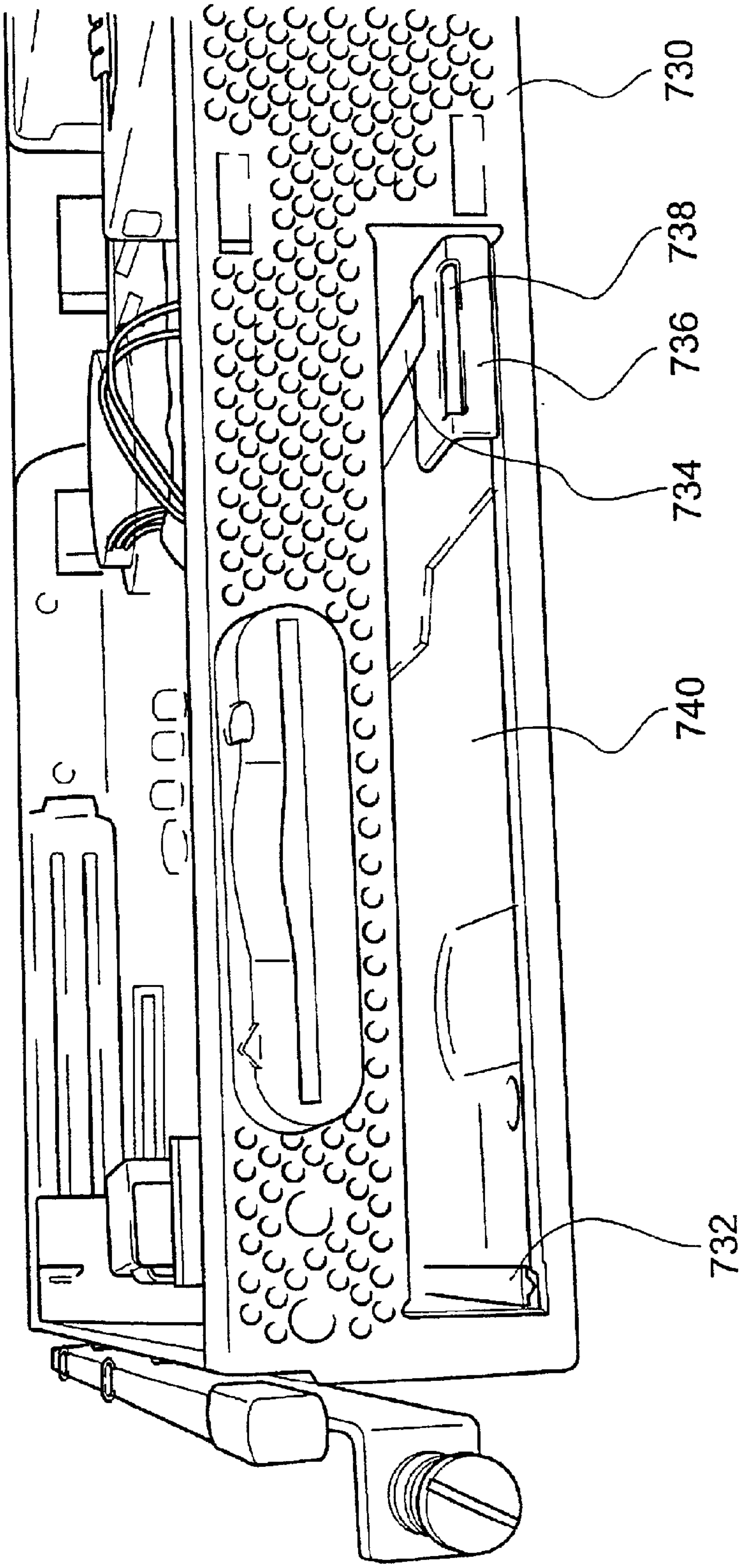
FIG. 6 is a further illustration of the media drive housing of an embodiment of the invention.

FIG. 6 is a further illustration of the media drive housing of an embodiment of the invention. This shows the front of the computer system housing 10 with the front bezel 19 and the CD-ROM drive 34 removed. At the bottom right (as seen in FIG. 6) of the aperture 740 forming the interior of the media drive bay housing, there is a step 736 with electromagnetic interference fingers 738 mounted at the top. Behind the step 736 a rail 734 forms a slide for supporting the CD-ROM drive 34. At the bottom left (as seen in FIG. 6) of the aperture 740 forming the interior of the media drive bay housing, there is a rail 732 forming a further slide for supporting the CD-ROM drive 34. The rail 734 is higher than the rail 732 in the present instance as the CD-ROM drive to be used has a portion of reduced thickness at the bottom right (as viewed with respect to the direction of insertion into the drive bay housing 720), as can be seen from FIGS. 3 and 4.

The resilient tongue 722, in bearing down on the top of the CD-ROM drive casing 702, has the effect of bearing the CD ROM drive 34 down onto the support surfaces formed by the rails 732 and 734. This further enhances the stable mounting of the CD-ROM drive within the media drive housing 720, and avoids the risk of excessive noise in use due to vibration.

Although a particular embodiment of the invention has been described, it will be appreciated that the invention is not limited thereto and that many modifications, including additions, deletions and substitutions may be made within the spirit and scope of the claimed invention.

For example, although in the present instance the media drive is a CD-ROM drive, in other examples the media drive could be another sort of media drive, for example a Digital Versatile Disk (DVD) drive, a tape drive, etc.

What is claimed is:

1. A system unit comprising a media drive bay and a media drive, the media drive bay comprising:

a drive bay housing having the media drive received therein, the media drive having a connector on a rear surface thereof and a springy latching member secured to said rear surface;

a connector to interface with the connector of the media drive;

a resilient tongue formed integrally with a first side of the media drive bay housing, which resilient tongue is operable to urge onto the media drive; and a detent for latching the springy latching member secured to the media drive.

2. The system unit of claim 1, wherein the resilient tongue is located on a first side of the drive bay housing, and wherein support surfaces being defined on a second side of the drive bay housing opposite to the first side, whereby the resilient tongue applies pressure on an inserted media drive to press the media drive against the support surfaces.

3. The system unit of claim 1, wherein the springy latching member is made of springy metal.

4. The system unit of claim 1, wherein the media drive is a commercially available media drive for non-removable use, the media drive being modified by the provision of the springy latching member to provide for removability.

5. The system unit of claim 1, wherein the system unit is a rack-mountable computer server.

6. The system unit of claim 2, wherein the support surfaces form slides within the drive bay housing.

7. The system unit of claim 3, wherein the springy latching member is secured to the rear surface of the media drive by screws that engage with pre-existing holes on a casing of the media drive.

8. The system unit of claim 7, wherein the springy latching member comprises a plate that is secured to the rear surface of the media drive and a resilient latching projection configured to latch behind the detent of the media drive bay housing.

9. A media drive comprising a connector at a rear surface thereof and a latching member secured to said rear surface, the latching member comprising a plate including formations to enable securing of the latching member to the rear surface of the media drive and an integral resilient latching projection.

10. The media drive of claim 9, wherein the latching member is operable to latch behind a detent of a media drive bay when the media drive is received by the media drive bay.

11. The media drive of claim 9, wherein the formations comprises holes for receiving screws.

12. The media drive of claim 9, wherein the latching member is formed of springy metal.

13. The media drive of claim 9, wherein the latching member is secured to the rear surface of the media drive by screws that engage with pre-existing holes on a casing of the media drive.

14. The media drive of claim 13, wherein the latching member comprises a plate that is secured to the rear surface of the media drive.

15. A media drive, commercially available for non-removable use, the media drive comprising a connector at a rear surface thereof and being modified by the provision of a latching member, the latching member comprising a plate including formations to enable securing of the latching member to the rear surface of the media drive and an integral resilient latching projection.

16. The media drive of claim 15, wherein the latching member is operable to latch behind a detent of a media drive bay when the media drive is received by said media drive bay.

17. The media drive of claim 15, wherein the formations comprise holes for receiving screws, the latching member being secured to the media drive by screws that pass through the holes into the rear surface of the media drive.

18. The media drive of claim 15, wherein the latching member is formed of springy metal.

19. A system unit comprising media drive bay means and a media drive, the media drive bay means comprising:

drive bay housing means having the media drive received therein, the media drive having a connector means on a rear surface thereof and a springy latching member secured to said rear surface;

connector means for interfacing with the connector means of the media drive;

resilient tongue means for urging onto a received media drive, said resilient tongue means being formed integrally with a first side of the media drive bay housing means; and detent means for latching the springy latching member secured to the media drive.

20. A system unit comprising:

a media drive bay with a connector; and a media drive received in the media drive bay, the media drive comprising a connector at a rear surface thereof and a latching member secured to said rear surface, the latching member comprising a plate including formations to enable securing of the latching member to the rear surface of the media drive and an integral resilient latching projection.

21. The system unit of claim 20 comprising a resilient tongue formed integrally with a first side of a media drive bay housing of the media drive bay, which resilient tongue is operable to urge onto the media drive, and a detent for latching the latching member of the media drive.

22. The system unit of claim 21, further comprising support surfaces being defined on a second side of the drive bay housing opposite to the first side, whereby the resilient tongue applies pressure on the media drive to press the media drive against the support surfaces.

23. The system unit of claim 22, wherein the support surfaces form slides within the drive bay housing.

24. A media drive removeably receivable in a media drive bay, the media drive comprising a connector at a rear surface thereof and a springy latching member secured to said rear surface for latching with a detent of the media drive bay.

25. A media drive, commercially available for non-removable use, the media drive comprising a connector at a rear surface thereof and being modified by the provision of a springy latching member on said rear surface.

26. A system unit comprising:

a media drive bay with a connector and a detent; and a media drive received in the media drive bay, the media drive comprising a connector at a rear surface thereof and a springy latching member secured to said rear surface for latching with the detent.

* * * * *